United States Patent [19]

Lederman

[11] Patent Number: 4,462,608

[45] Date of Patent: Jul. 31, 1984

[54] STEERABLE SUSPENSION BEARING ASSEMBLY

[75] Inventor: Frederick E. Lederman, Sandusky, Ohio

[73] Assignee: General Motors Corporation, Detroit, Mich.

[21] Appl. No.: 528,569

[22] Filed: Sep. 1, 1983

[51] Int. Cl.³ ............................................. B60G 11/42
[52] U.S. Cl. ..................................... 280/668; 267/8 R; 267/20 A; 267/33; 280/690; 280/692; 280/710; 308/231; 384/125
[58] Field of Search ............... 280/668, 660, 663, 667, 280/670, 673, 688, 690, 692, 696, 722, 724, 710, 96.1; 267/64.15, 8 R, 20 A, 33; 308/35, 231; 384/125

[56] References Cited

U.S. PATENT DOCUMENTS

| Re. 31,184 | 3/1983 | Lederman | 280/668 |
| 4,248,454 | 2/1981 | Cotter et al. | 280/668 |
| 4,256,292 | 3/1981 | Sullivan, Jr. et al. | 267/8 R |
| 4,325,566 | 4/1982 | Stephan | 280/668 |

Primary Examiner—Joseph F. Peters, Jr.
Assistant Examiner—Mitchell J. Hill
Attorney, Agent, or Firm—Patrick M. Griffin

[57] ABSTRACT

A bearing assembly for a stamped MacPherson strut front suspension includes an angular contact ball bearing with stamped upper and lower races. The lower race is seatable on a bearing seat of the cylindrical reservoir of the damper while the upper race is engaged with the lower surface of a lower spring seat. A combined shielding and retaining wall has an upper wall engageable with the upper surface of the lower spring seat and a cylindrical inner wall engageable with the lower race to retain the bearing and lower spring seat together as a subassembly separable from the suspension. When assembled in the suspension, the upper wall of the shielding is maintained spaced from the upper surface of lower spring seat by the force of the suspension coil spring to allow free turning of the bearing.

3 Claims, 3 Drawing Figures

STEERABLE SUSPENSION BEARING ASSEMBLY

BACKGROUND OF THE INVENTION

The use of vehicle suspensions of the type commonly known as a Mac Pherson strut is increasing, especially for steerable front suspensions. In this type of suspension, a piston type damper commonly has a cylindrical reservoir and a piston rod contained therein. The bottom of the cylindrical reservoir is attached to the steering knuckle, the top of the piston rod is rigidly attached to an elastomer mount on the vehicle, and a shock absorbing compression coil spring surrounds the damper and is seated between an upper and a lower spring seat. In a steerable suspension, the top coil of the spring turns relative to the upper mount or the cylindrical reservoir turns relative to the lower coil of the spring. In either case, it is desirable to interpose a bearing between the two relatively rotating parts to facilitate steering and handling. U.S. patent to Pflughaupt et al, No. 4,260,117, shows an anti-friction bearing unit interposed between a lower spring seat and a bearing seat on the cylindrical reservoir of the damper.

There may be a problem in suspension structures which place the bearing between the lower spring seat and the damper. The lower part of the suspension may present a more harsh environment, increasing the need for sealing and shielding of the bearing.

SUMMARY OF THE INVENTION

The subject invention provides a bearing assembly in which a shielding and retention member retains a bearing together with a lower spring seat as a unit separable from the suspension strut for ease of assembly and shipping, and which, when in place within the suspension, allows free turning of the bearing while at the same time shielding it from contaminants in the relatively harsher environment.

The vehicle suspension is a steerable strut type front suspension in which the top coil of the shock absorbing compression spring surrounding a piston type damper is held non-turnably with respect to an upper elastomer mount on the vehicle. The lower coil of the spring sits on a lower spring seat which surrounds and is radially spaced from the cylindrical reservoir of the damper. An anti-friction bearing is seated between the undersurface of the lower spring seat and a bearing seat portion of the damper to allow the damper to turn easily relative to the spring seat and the spring.

The shielding and retention member of the invention includes a generally cylindrical inner shielding wall between and radially spaced from the cylindrical reservoir of the damper and the lower spring seat and extending axially along the inner side of the bearing from a lower race of the bearing to the top surface of the lower spring seat to completely shield the inner side of the bearing from the damper. In the embodiment disclosed, the lower race also includes a resilient elastomer layer which is seated on the generally angular bearing seat portion of the cylindrical reservoir of the damper. The shielding and retention member also includes a generally annular upper shielding wall which is integral with the top of the inner shielding wall and which extends radially outwardly over the upper surface of the lower spring seat.

Finally, the lower edge of the cylindrical inner shielding wall is crimped into gripping engagement with the elastomer layer on the lower race, thus maintaining the lower spring seat and the bearing together as a separate subassembly. A slight axial clearance may exist between the upper shielding wall and the top surface of the lower spring seat. The clearance is small enough that the subassembly remains intact and substantially rattle free for ease of shipping and handling. When assembled into the complete suspension, the axial force of the compression spring presses down on the lower spring. This serves to bias the bearing between the undersurface of the lower spring seat and the bearing seat portion of the damper and acts to maintain or to slightly increase the axial clearance between the upper shielding wall and the lower spring seat. Clearance is required between the lower spring seat and the shielding and retention member so that the bearing may freely turn. Even with such clearance the bearing is essentially completely shielded by the inner shielding wall and by the upper shielding wall which extends out over the top of the lower spring seat in closely conforming relation thereto.

It is, therefore, a general object of the invention to provide an improved lower spring seat and anti-friction bearing subassembly for a steerable vehicle suspension strut.

It is a more specific object of the invention to provide a subassembly on which a shielding and retention member retains the lower spring seat and bearing together while allowing the free turning and shielding of the bearing when the subassembly is assembled into the vehicle suspension.

It is a still more specific object of the invention to provide such a subassembly in which a shielding and retention member includes a cylindrical inner wall shielding the radially inner side of the bearing and an upper shielding wall extending over the top surface of the lower spring seat and the bearing with as sufficiently small clearance from the lower spring seat that the bearing and lower spring seat are maintained together as a substantially rattle free subassembly for shipping and handling said clearance being maintained or increased when the subassembly is assembled into the vehicle suspension so that the lower spring seat may turn freely on the bearing while the shielding and retention member continues to shield said bearing.

DESCRIPTION OF THE PREFERRED EMBODIMENT

Figure 1:
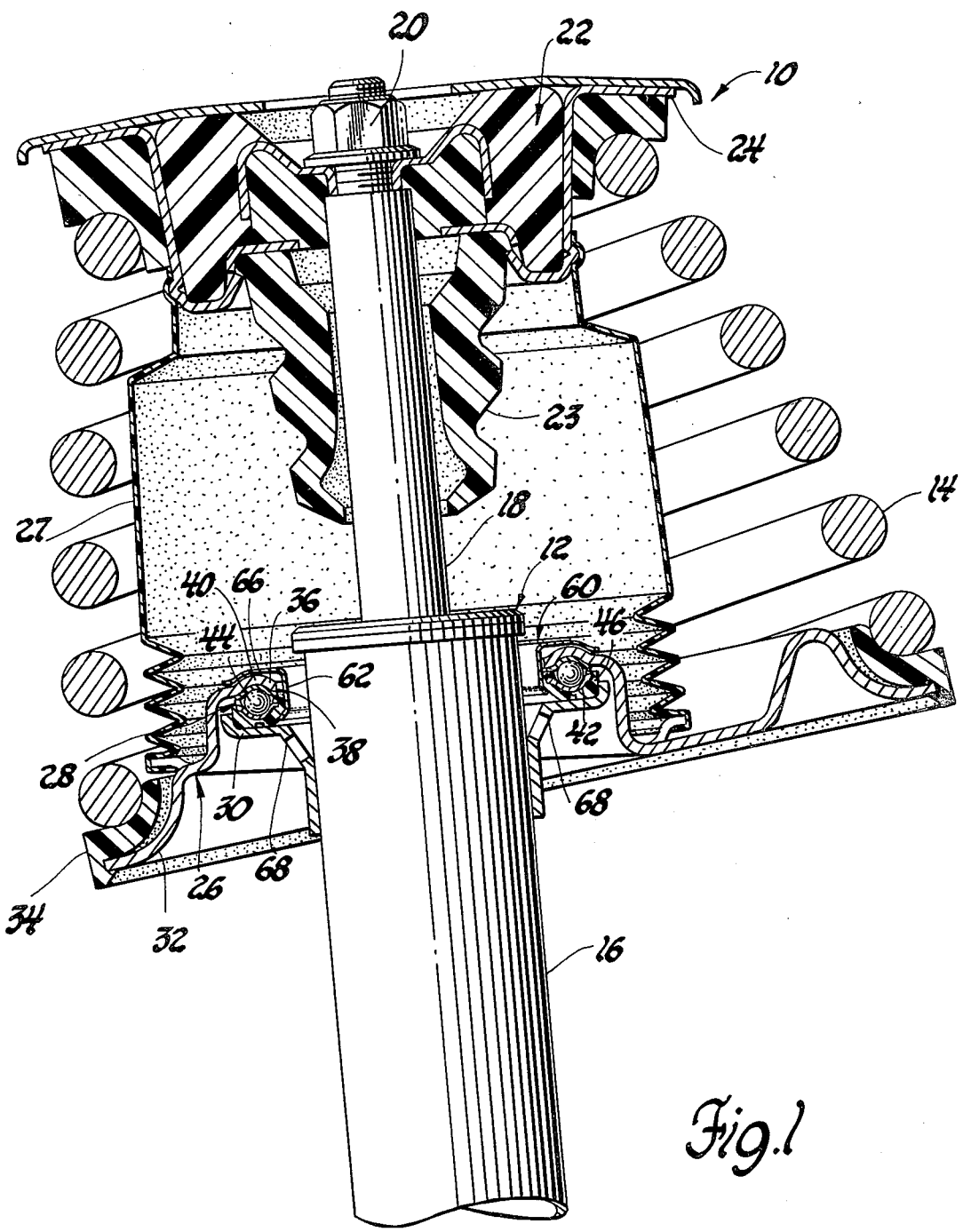
Figure 2:
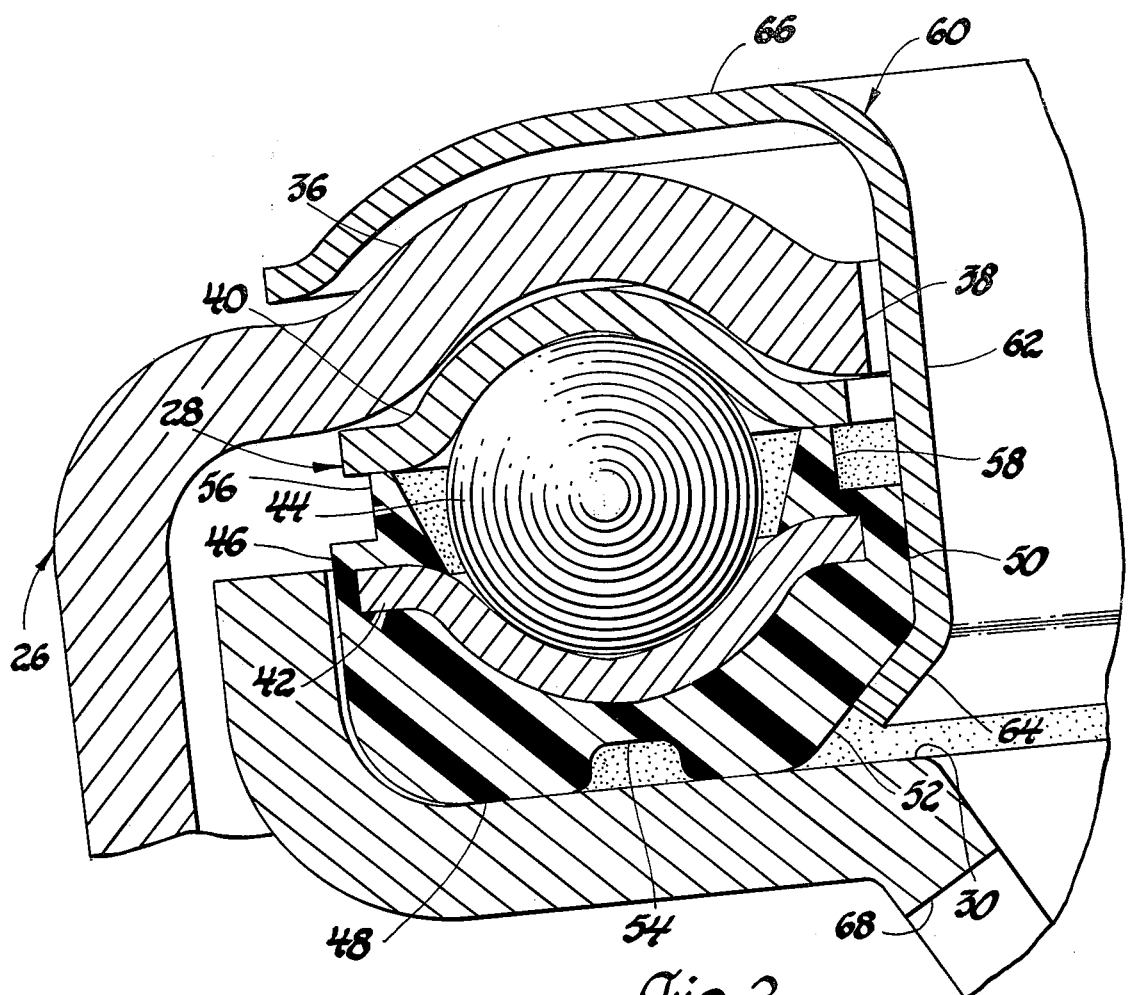
Figure 3:
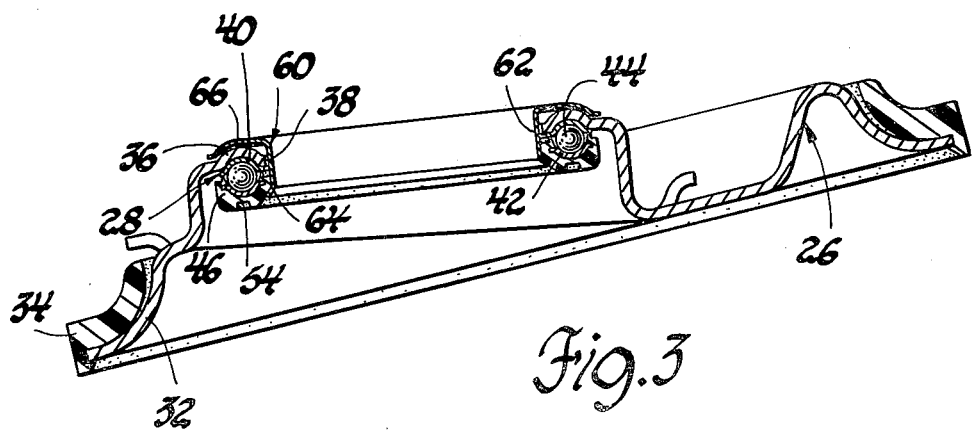

These and other objects of the invention will appear from the following written description and the drawings in which:

FIG. 1 is a view of part of the vehicle suspension showing the damper, the shock absorbing compression spring and the subassembly of the invention in place in the suspension, FIG. 2 is an enlarged fragment of the sectional view of FIG. 1, and FIG. 3 is a cross-sectional view of the subassembly of the invention separate from the vehicle suspension strut.

Referring first to FIG. 1, a vehicle suspension strut indicated generally at 10 includes a damper 12 surrounded by a shock absorbing compression coil sring 14. Damper 12 includes a lower cylindrical reservoir 16 out of which extends a piston rod 18, the top of which is threaded and rigidly attached by nut 20 to an elastomer mount indicated generally at 22 which is in turn attached rigidly to a sheet metal tower structure in the front wheel well of the vehicle, not shown. A standard jounce bumper 23 surrounds the top part of piston rod 18. The top coil of the spring 14 is seated on an upper spring seat 24, also attached rigidly to the vehicle while the lower coil sits on a lower spring seat indicated generally at 26. An anti-friction bearing indicated generally at 28 is seated between the undersurface of lower spring seat 26 and a generally annular bearing seat 30 which is in turn rigidly attached to cylindrical reservoir 16. Thus, as cylindrical reservoir 16 is turned by the steering system of the vehicle, not shown, relative to piston rod 18, it will turn on bearing 28 relative to lower spring seat 26, but spring 14 will not turn relative to the vehicle. A flexible stone shield 27 runs between the two spring seats 24 and 26. This much of suspension 10 and the operation thereof is standard, and the details thereof will not be further described.

Referring next to FIG. 3, the subassembly of the invention is shown separate from the vehicle suspension. Lower spring seat 26 includes a generally annular outer skirt 32 upon which the lower coil of spring 14 seats, insulated by insulator 34. Outer skirt 32 is not symmetrical, because of the angle of suspension 10 relative to the vehicle. The radially inner portion of lower spring seat 26 includes a generally annular bearing housing portion 36 which has an opening 38 therethrough which has a size sufficient to fit over and clear the cylindrical reservoir 16, as may be best seen in FIG. 2. Bearing housing portion 36 is stamped with a general cup shape in order to fit closely over bearing 28, which, in the embodiment disclosed, includes a symmetrical upper race 40 and a lower race 42 which is respective to the lower surface of housing portion 36 with a complement of anti-friction elements, bearing balls 44 in this embodiment, between lower race 42 and housing portion 36. It is to be understood, however, that any anti-friction bearing 28 may be used, and the shape of bearing housing portion 36 would be modified accordingly. In fact, bearing housing portion 36 could serve as well as the upper race of anti-friction bearing 28, with just lower race 42 serving to contain balls 44 with housing portion 36, in an alternate design, not shown.

Referring to FIG. 2, lower race 42 includes an elastomer layer 46 which may be molded around the bottom thereof, having a generally flat lower surface 48 which seats directly on bearing seat 30. The elastomer layer 46 has a generally cylindrical radially inner wall 50 which surrounds and is radially spaced from cylindrical reservoir 16, and a generally conical wall 52 merging with surface 48. In addition, the elastomer layer 46 includes a circular groove 54 cut or formed into bottom surface 48 and integrally molded sealing walls 56 and 58. It is to be understood that elastomer layer 46 is not strictly necessary to the operation of the invention in its broadest sense, but cooperates therein in a manner to be described below.

Lower spring seat 26 and anti-friction bearing 28 are maintained together as a separate subassembly, and bearing 28 is shielded by the shielding and retention member of the invention, designated generally at 60. Member 60 includes a first generally cylindrical inner shielding wall 62 best visible in FIG. 2, which has a diameter large enough to clear damper 16, but small enough to clear the edge of opening 38. Therefore, inner shielding wall 62 surrounds and is radially spaced from cylindrical reservoir 16, and is also radially spaced from the edge of opening 38 when assembled in the suspension 10. Shielding wall 62 extends axially from a radially outwardly turned lower edge or retention portion 64 to a generally annular second upper shielding wall 66, thus shielding the radially inner side of balls 44 from the entry of contaminants at cylindrical reservoir 16. The inner diameter of inner wall 50 of elastomer layer 46 and the outer diameter of cylindrical wall 62 are substantially equal, thus creating a tight mating or frictional fit between the two, in addition to a gripping engagement of edge 64 with wall 52 of elastomer layer 46.

Inner shielding wall 62 is integral with upper shielding wall 66, which extends radially outwardly over the upper surface of bearing housing portion 36. Upper shielding wall 66 is shaped to conform fairly closely to the shape of the top surface of housing portion 36, and could be made to extend even farther thereover if desired to increase the shielding capability of this wall 66.

The subassembly seen in FIG. 3 would be built up by simply laying housing portion 36 into place against upper race 40, whereupon shielding and retention member 60 would be press fit down with the outer diameter of cylindrical wall 62 tightly engaging the inner diameter of wall 50 until upper shielding wall 66 lightly engaged the upper surface of bearing housing portion 36. Then, lower edge or retention portion 64 on the first shielding wall 62 would be crimped outwardly to nonturnably engage conical wall 52. The total axial length of cylindrical inner wall 62 from its lower edge 64 to upper shielding wall 66 is determined such that there will be a slight axial clearance between the upper surface of housing portion 36 and upper shielding wall 66 after the subassembly is assembled into the suspension strut 10, as may best be seen in FIGS. 1 and 2. The crimping also serves to retain the lower spring seat 26 and bearing 28 together, as seen in FIG. 3, as a subassembly which is substantially rattle-free. Prior to assembly with the suspension strut the said axial clearance in the subassembly may vary from near zero to a few thousandths of an inch, and need not be precisely or rigidly controlled. The requirement is to hold the spring seat and bearing together until it is installed in the suspension strut.

The subassembly of FIG. 3 may be assembled to the suspension strut 10 in a fixture. The innermost diameter of the shielding and retention member 60 is large enough that the subassembly of FIG. 3 will slip over the largest diameter of the damper 12. This permits the subassembly to be moved quickly to its assembled position with the elastomer clad lower race 42 adjacent to bearing seat 30 as shown in FIG. 1. The diameter of first wall 62 may be made large enough to fit over several sizes of damper 12. Coil spring 14 is compressed against outer skirt 32 to force bearing housing portion 36 down upon upper race 40, in turn loading bearing balls 44 against lower race 42, race 42 against elastomer layer 46 and ultimately against bearing seat portion 30. Because of the tight engagement of cylindrical wall 62 with elastomer layer 46 as described, and because cylindrical wall 62 is clear of all other components, any further compression of sealing walls 56 and 58 or of elastomer layer 46 which occurs will serve only to provide more or maintain not less than the initial axial clearance between upper shielding wall 66 and the top surface of bearing housing portion 36. Thus, because shielding and retention member 60 is clear of lower spring seat 26 and upper race 40 of bearing 28, lower spring seat 26 can turn easily and freely on bearing 28 or, from the perspective of the vehicle, cylindrical reservoir 16 can turn freely with respect to the non-turnably held compression spring 14.

Referring to FIG. 1, it will be apparent that the balls 44 of bearing 28 are completely shielded on its top and radial inner side and any contaminants entering between wall 62 and cylindrical reservoir 16 will drop down through weep holes 68 cut through the lower part of bearing seat portion 30. Any contaminants building up on the top of upper shielding wall 66 will be shed down and over the top of lower spring seat 26. It will also be noted that in the generally annular area between cylindrical wall 62 and damper 12, any large contaminants will not be wedged between relatively rotating parts, as these two parts are relatively stationary. While upper shielding wall 66 and lower spring seat 26 do relatively rotate, the clearance between them is slight, and the close conformation and length of the path prevents the entry of contaminants. The radial outer side of bearing balls 44 are sealed by sealing wall 56. As previously mentioned, any bearing 28 could be used with the shielding and retention member 60 of the invention, as long as means are utilized to permit the deforming of a lower portion of cylindrical wall 62 into a subassembly non-turnably held with lower race 42. Elastomer layer 46 is the means in the embodiment disclosed. Elastomer layer could be made compressible enough that the axial clearance would be created by the force of the spring after assembly to the suspension. Were a different or less compressible material to be used, or a simple race to bearing seat contact, then the axial clearance between the upper surface of lower spring seat 26 and upper shielding wall 66 would be more rigidly controlled when the subassembly was built up. What is required is some sort of lower race to seat directly or indirectly on the bearing seat portion of the damper, to contain the balls in cooperation with the bearing housing portion and to be non-turnably joined to the first shielding wall. In addition, upper shielding wall 66 could be given a different shape or a larger extent to cover more of the top surface of lower spring seat 26, as long as the required clearances were maintained in operation as described.

The embodiments of the invention in which an exclusive property or privilege is claimed are defined as follows:

1. In a steerable vehicle suspension strut of the type in which a shock absorbing compression spring surrounds a piston type damper and has one spring end relatively non-turnable with respect to the vehicle, while the other spring end biases a lower spring seat which is relatively turnable with respect to said damper on the anti-friction elements of a bearing seated on a bearing seat of the damper, the improvement comprising a shielding and retention means for retaining the lower spring seat and bearing together as a subassembly of the suspension strut when separate from the strut, as well as for shielding the bearing when the subassembly is assembled with the strut and comprising, a generally cylindrical first shielding wall portion spaced sufficiently from the damper to provide clearance therefrom as the subassembly is assembled with the strut and extending a sufficient axial distance alongside the bearing to shield the bearing from contaminants thereat, a generally annular second shielding wall portion extending from the first shielding wall portion over a portion of the lower spring seat and spaced a predetermined axial clearance therefrom, and a retention portion on the first shielding wall joined non-rotatably to a portion of the bearing and cooperating with said first shielding wall portion to hold said bearing and said lower spring seat portion together as a separate subassembly until assembled with the suspension strut, the axial biasing of the lower spring seat toward the seated bearing by the spring when the subassembly is assembled with the suspension strut serving to maintain not less than the said axial clearance between the upper surface of the lower spring seat and the second shielding wall to assure free turning of the damper relative to the lower spring seat on the bearing, the first and second shielding walls acting to exclude contaminants from the bearing during its operation.

2. In a steerable vehicle suspension strut of the type in which the top coil of a shock absorbing compression spring surrounding a piston type damper is held non-turnably with respect to the vehicle, while the lower coil biasingly seats on a lower spring seat surrounding and radially spaced from the damper, with a bearing between the undersurface of the lower spring seat and a bearing seat portion of the damper to allow it to turn relative to the spring as the vehicle is steered, the improvement comprising a means for retaining the lower spring seat and bearing together as a unit separable from the suspension strut, as well as for shielding the bearing when assembled with the suspension strut, the retaining and shielding means comprising, a resilient bottom layer joined to a lower race of the bearing and engageable with the bearing seat portion, and a shielding and retention member, including a generally annular upper shielding wall closely conformable to a top surface of the lower spring seat and an inner shielding wall radially spaced from the damper and extending axially along the radially inner side of the bearing to shield the bearing thereat, the inner shielding wall further including a retention portion in sufficient gripping engagement with the resilient layer of the lower race to hold the upper shielding wall over the upper surface of the lower spring seat so that the lower spring seat and bearing are held together as a subassembly separate from the suspension strut, the axial bias of the compression spring against the lower spring seat, when the subassembly is assembled with the suspension strut, serving to compress the resilient bottom layer of the layer bearing race sufficiently to maintain the surface of the lower spring seat slightly axially away from the upper shielding wall sufficiently to allow free turning of the lower spring seat on the bearing, the first and second walls of the shielding member serving to protect the bearing from the entry of contaminants during its operation with the suspension strut.

3. A spring seat and anti-friction bearing subassembly for use in a vehicle suspension strut of the type having a shock absorbing compression spring surrounding a damper with one end of the spring being held non-turnably with respect to the vehicle while the other end biases the spring seat toward the anti-friction elements of the bearing and toward a spring seat on the damper, comprising, a spring seat having a generally annular bearing housing portion with an opening therethrough of sufficient size to clear the damper, a generally annular lower bearing race respective to the lower surface of the bearing housing portion of the spring seat with the anti-friction elements contained in cooperation therewith, a shielding and retention member including a generally cylindrical first wall of a diameter large enough to clear the damper and small enough to clear the edge of the bearing housing portion opening and extending axially from the upper surface of the bearing housing portion to the lower race, the shielding and retention member further including a generally annular second wall extending from the first wall over the upper surface of the bearing housing portion of the spring seat and shaped to conform substantially thereto, the first shielding wall further including a retention portion joined non-turnably to the lower race to space the second shielding wall axially away from the bearing housing portion upper surface with a predetermined axial clearance small enough to retain the spring seat, lower race and anti-friction elements together as a substantially rattle-free subassembly, the subassembly being fittable over the damper with the lower race adjacent to the bearing seat, the force of the compression spring on the spring seat biasing the anti-friction elements toward the lower race and toward the bearing seat to maintain not less than the predetermined axial clearance between the second wall and the upper surface of the bearing housing portion to assure free turning of the spring seat relative to the damper on the anti-friction elements while the first wall shields the anti-friction elements from contaminants along the damper and the axially spaced second wall shields the anti-friction elements of the bearing from the entry of contaminants along the bearing housing portion of the spring seat.

* * * * *